US011073618B2

(12) United States Patent
Singer et al.

(10) Patent No.: US 11,073,618 B2
(45) Date of Patent: *Jul. 27, 2021

(54) OPTICAL AMPLIFIER IN RETURN PATH OF COHERENT LIDAR SYSTEM

(71) Applicant: GM Global Technology Operations LLC, Detroit, MI (US)

(72) Inventors: Scott Singer, San Gabriel, CA (US); Lute Maleki, Pasadena, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 646 days.

This patent is subject to a terminal disclaimer.

(21) Appl. No.: 15/944,201

(22) Filed: Apr. 3, 2018

(65) Prior Publication Data
US 2019/0302269 A1    Oct. 3, 2019

(51) Int. Cl.
*G01S 17/931* (2020.01)
*G01S 7/481* (2006.01)
*G01S 7/4912* (2020.01)

(52) U.S. Cl.
CPC ......... *G01S 17/931* (2020.01); *G01S 7/4818* (2013.01); *G01S 7/4918* (2013.01)

(58) Field of Classification Search
None
See application file for complete search history.

(56) References Cited

U.S. PATENT DOCUMENTS

| 4,311,385 A * | 1/1982 | Keene | G01B 11/26 |
| | | | 356/139.08 |
| 8,077,795 B2 * | 12/2011 | Haartsen | H04B 1/7101 |
| | | | 375/285 |
| 2016/0113507 A1 * | 4/2016 | Reza | G01N 21/1702 |
| | | | 356/477 |
| 2016/0299228 A1 * | 10/2016 | Maleki | G01S 17/931 |
| 2019/0011558 A1 * | 1/2019 | Crouch | G01S 17/26 |
| 2019/0064358 A1 * | 2/2019 | Desai | H01S 5/02252 |
| 2019/0204444 A1 * | 7/2019 | Bechadergue | G01S 7/006 |
| 2019/0257927 A1 * | 8/2019 | Yao | G01S 7/4815 |
| 2019/0310071 A1 * | 10/2019 | Doerr | G01S 7/4863 |
| 2020/0333445 A1 * | 10/2020 | Gronenborn | G01S 7/4815 |

* cited by examiner

*Primary Examiner* — Yuqing Xiao
*Assistant Examiner* — Amir J Askarian
(74) *Attorney, Agent, or Firm* — Cantor Colburn LLP

(57) ABSTRACT

A coherent lidar system includes a light source to output a continuous wave, and a modulator to modulate a frequency of the continuous wave and provide a frequency modulated continuous wave (FMCW) signal. The system also includes an aperture lens to obtain a receive beam resulting from a reflection of an output signal obtained from the FMCW signal, and an optical amplifier in a path of the receive beam to output an amplified receive beam. A method of fabricating the system includes arranging a light source to output a continuous wave, and disposing elements to modulate the continuous wave and provide the FMCW signal. The method also includes arranging an aperture to obtain a receive beam resulting from a reflection of an output signal obtained from the FMCW signal, and disposing an optical amplifier in a path of the receive beam to output an amplified receive beam.

15 Claims, 5 Drawing Sheets

OPTICAL AMPLIFIER IN RETURN PATH OF COHERENT LIDAR SYSTEM

INTRODUCTION

The subject disclosure relates to an optical amplifier in the return path of a coherent light detection and ranging (lidar) system.

Vehicles (e.g., automobiles, trucks, construction equipment, farm equipment, automated factory equipment) increasingly include sensors that obtain information about the vehicle operation and the environment around the vehicle. Some sensors, such as cameras, radio detection and ranging (radar) systems, and light detection and ranging (lidar) systems can detect and track objects in the vicinity of the vehicle. By determining the relative location and heading of objects around the vehicle, vehicle operation may be augmented or automated to improve safety and performance. For example, sensor information may be used to issue alerts to the driver of the vehicle or to operate vehicle systems (e.g., collision avoidance systems, adaptive cruise control system, autonomous driving system). Typical lidar systems are time-of-flight systems that require that any amplification of reflected signals is performed electronically using detectors such as avalanche photodiodes, high speed electronic amplifiers, and the like. However, electronic amplification increases noise and degrades the signal-to-noise ratio (SNR). In time-of-flight systems, optical amplification also necessarily amplifies any background or interfering light sources. In contrast, in coherent lidar systems that use frequency modulated continuous wave (FMCW) lidar, such parasitic light levels are filtered by a coherent combination of the reflected signal with a local source signal. Accordingly, it is desirable to provide an optical amplifier in the return path of a coherent lidar system.

SUMMARY

In one exemplary embodiment, a coherent lidar system includes a light source to output a continuous wave, and a modulator to modulate a frequency of the continuous wave and provide a frequency modulated continuous wave (FMCW) signal. The system also includes an aperture lens to obtain a receive beam resulting from a reflection of an output signal obtained from the FMCW signal, and an optical amplifier in a path of the receive beam to output an amplified receive beam.

In addition to one or more of the features described herein, the system also includes a second optical amplifier configured to amplify the FMCW signal provided by the modulator.

In addition to one or more of the features described herein, the modulator includes a resonator.

In addition to one or more of the features described herein, the modulator applies a controlled voltage to the resonator such that modulation of the controlled voltage results in modulation of the frequency of the continuous wave.

In addition to one or more of the features described herein, the system also includes a beam splitter configured to split the FMCW signal into the output signal and a local oscillator (LO) signal.

In addition to one or more of the features described herein, the system also includes an alignment element configured to align the LO signal and the amplified receive beam to produce a co-linear signal.

In addition to one or more of the features described herein, the system also includes one or more photodetectors to obtain an interference result based on interference between the LO signal and the amplified receive beam in the co-linear signal.

In addition to one or more of the features described herein, the lidar system is a monostatic system.

In addition to one or more of the features described herein, the system also includes a circulator configured to direct the output signal to the aperture lens and direct the receive beam to the optical amplifier.

In addition to one or more of the features described herein, the lidar system is within or on a vehicle and is configured to detect a location and speed of an object relative to the vehicle.

In another exemplary embodiment, a method of assembling a coherent lidar system includes arranging a light source to output a continuous wave, and disposing elements to modulate the continuous wave and provide a frequency modulated continuous wave (FMCW) signal. The method also includes arranging an aperture lens to obtain a receive beam resulting from a reflection of an output signal obtained from the FMCW signal, and disposing an optical amplifier in a path of the receive beam to output an amplified receive beam.

In addition to one or more of the features described herein, the method also includes disposing a second optical amplifier to amplify the FMCW signal provided by the elements.

In addition to one or more of the features described herein, the disposing the elements to modulate the continuous wave includes disposing a resonator at an output of the light source.

In addition to one or more of the features described herein, the disposing the elements to modulate the continuous wave also includes applying a controlled voltage to the resonator such that modulation of the controlled voltage results in modulation of the frequency of the continuous wave.

In addition to one or more of the features described herein, the method also includes arranging a beam splitter to split the FMCW signal into the output signal and a local oscillator (LO) signal, disposing an alignment element to facilitate alignment of the LO signal and the amplified receive beam and output a co-linear signal, and disposing one or more photodetectors to receive the co-linear signal and facilitate interference between the LO signal and the amplified receive beam.

In another exemplary embodiment, a vehicle includes a coherent lidar system that includes a light source to output a continuous wave and a modulator to modulate a frequency of the continuous wave and provide a frequency modulated continuous wave (FMCW) signal. The coherent lidar system also includes an aperture lens to obtain a receive beam resulting from a reflection of an output signal obtained from the FMCW signal, and an optical amplifier in a path of the receive beam to output an amplified receive beam. The vehicle also includes a controller to augment or automate operation of the vehicle based on information from the coherent lidar system.

In addition to one or more of the features described herein, the coherent lidar system also includes a second optical amplifier to amplify the FMCW signal provided by the modulator.

In addition to one or more of the features described herein, the modulator includes a resonator.

In addition to one or more of the features described herein, the modulator also applies a controlled voltage to the resonator such that modulation of the controlled voltage results in modulation of the frequency of the continuous wave.

In addition to one or more of the features described herein, the coherent lidar system also includes a beam splitter configured to split the FMCW signal into the output signal and a local oscillator (LO) signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
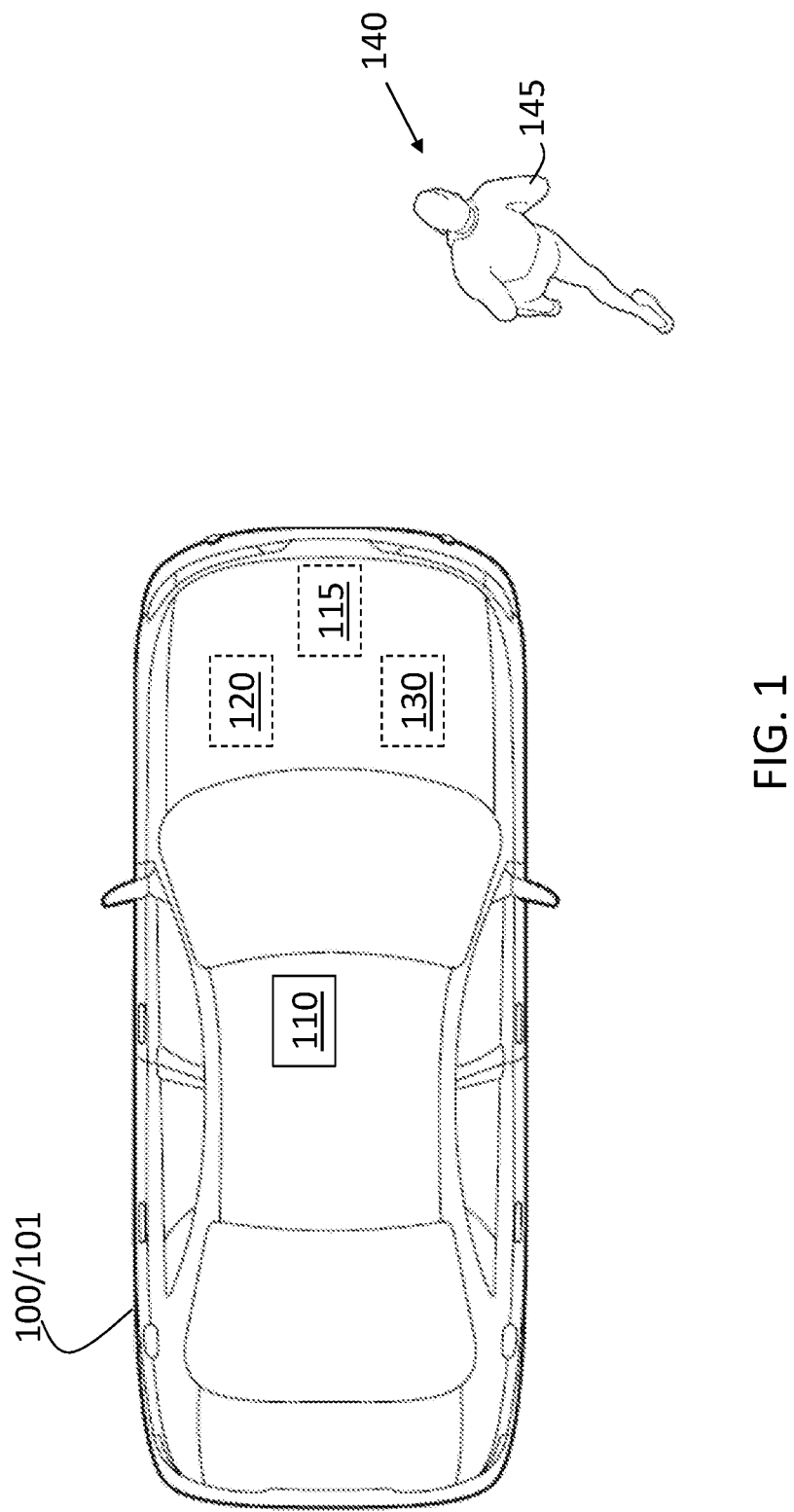
FIG. 1 is a block diagram of a scenario involving an optical amplifier in the return path of a coherent lidar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a lidar system may be one of several sensors that provide information to augment or automate vehicle operation. Traditional lidar systems involve the transmission of a series of light pulses. The time-of-flight of a given pulse (i.e., the time between transmission of the pulse and reception of a reflected pulse resulting from reflection by a target) indicates the distance to the target. This time-of-flight information obtained using a series of pulses may indicate target speed and direction of travel. This type of lidar system requires that the reflection be undisturbed for purposes of time-of-flight determination. Thus, any amplification is post-detection amplification (i.e., after the optical detector) and uses electronic amplifiers. In addition, this type of lidar system is susceptible to light from a different source being mistaken for a reflection.

According to one or more embodiments detailed herein, the lidar system is a coherent system that relies on the transmission of FMCW signals and phase coherence between a source signal output by the light source, also referred to as the local oscillator (LO), and the resulting return signal reflected from a target which is time-delayed from the source signal. The optical interference between these two signals results in a beat frequency equivalent to that time-delay, which indicates distance to the target and speed of the target. Frequency of the light produced by the light source may be increased or decreased linearly over the FMCW signal. Using a combination of increasing and decreasing modulations, a triangle wave may be generated as the FMCW source signal. The frequencies of a reflection resulting from transmission of the FMCW signal indicate not only the range to the target that reflected the FMCW signal but also target speed. Further, light from a different source cannot be mistaken for a reflection due to the lack of phase coherence with the source signal output by the light source.

Still further, and according to embodiments of the systems and methods detailed herein, the coherent lidar system includes an optical amplifier in the return path. That is, the reflection may be optically amplified prior to detection by one or more optical detectors and processing without distorting the characteristics of interest. The FMCW signal that results from interference between the source signal and reflection is proportional to the geometric mean of the source signal power and reflected signal power, but the noise floor is limited by the electronic noise of the detection system including the optical detectors and electronic amplifiers. Thus, amplifying the return signal optically increases the FMCW signal without also amplifying the noise, thereby enhancing the SNR. The on-chip semiconductor-based optical amplifiers, according to one or more embodiments, can operate at the radio frequency (RF) range without requiring shielding to prevent sensitivity to RF noise from other sources.

Figure 2:
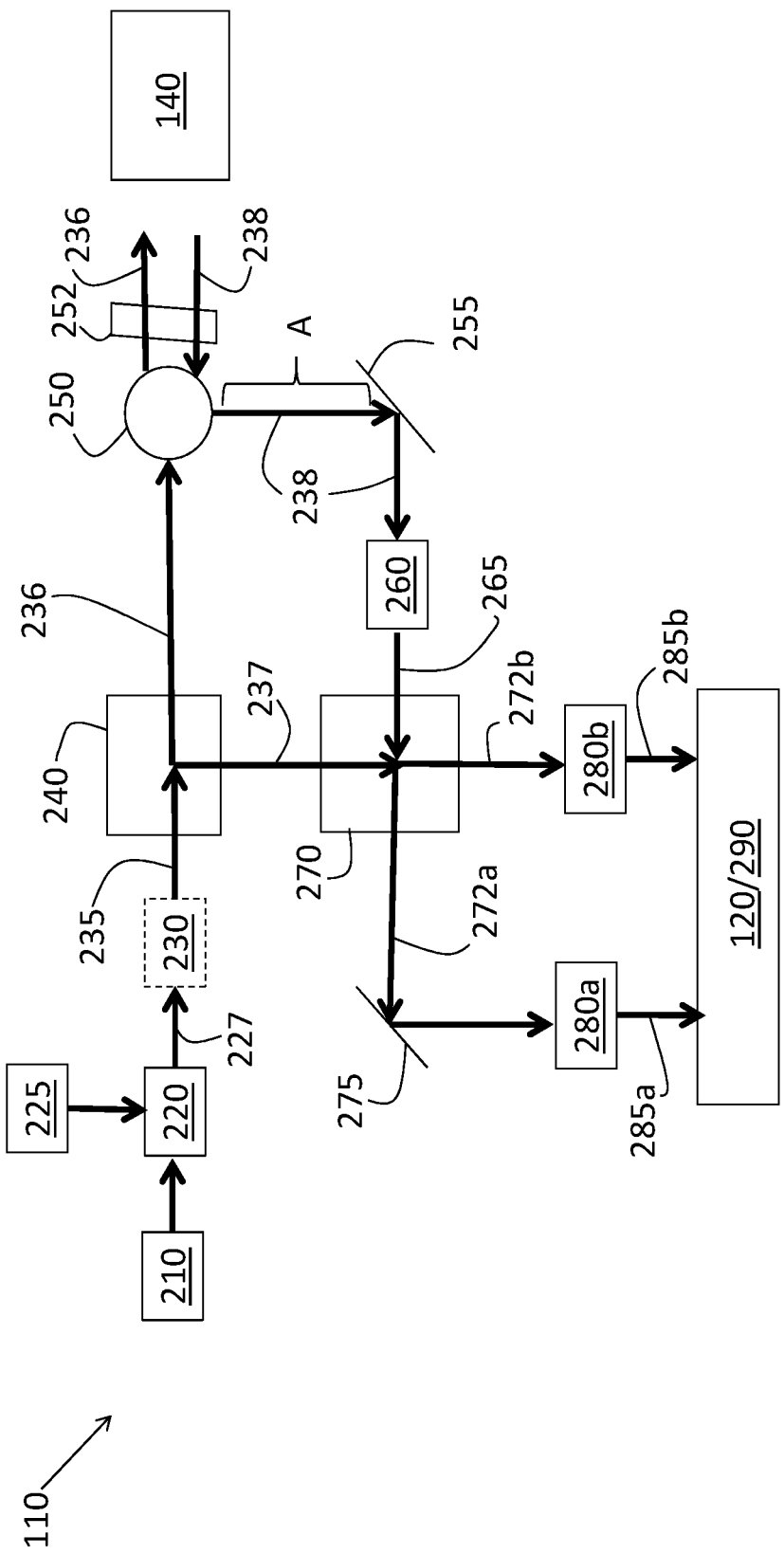
FIG. 2 is a block diagram detailing the lidar system with an optical amplifier in the return path of the lidar system according to one or more embodiments.

In accordance with an exemplary embodiment, FIG. 1 is a block diagram of a scenario involving an optical amplifier in the return path of a coherent lidar system 110. The vehicle 100 shown in FIG. 1 is an automobile 101. A coherent lidar system 110, with an optical amplifier in the return path as further detailed with reference to FIG. 2, is shown on the roof of the automobile 101. According to alternate or additional embodiments, one or more lidar systems 110 may be located elsewhere on the vehicle 100. Another sensor 115 (e.g., camera, microphone, radar system) is shown, as well. Information obtained by the lidar system 110 and one or more other sensors 115 may be provided to a controller 120 (e.g., electronic control unit (ECU)).

The controller 120 may use the information to control one or more vehicle systems 130. In an exemplary embodiment, the vehicle 100 may be an autonomous vehicle and the controller 120 may perform known vehicle operational control using information from the lidar system 110 and other sources. In alternate embodiments, the controller 120 may augment vehicle operation using information from the lidar system 110 and other sources as part of a known system (e.g., collision avoidance system, adaptive cruise control system). The lidar system 110 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 3:
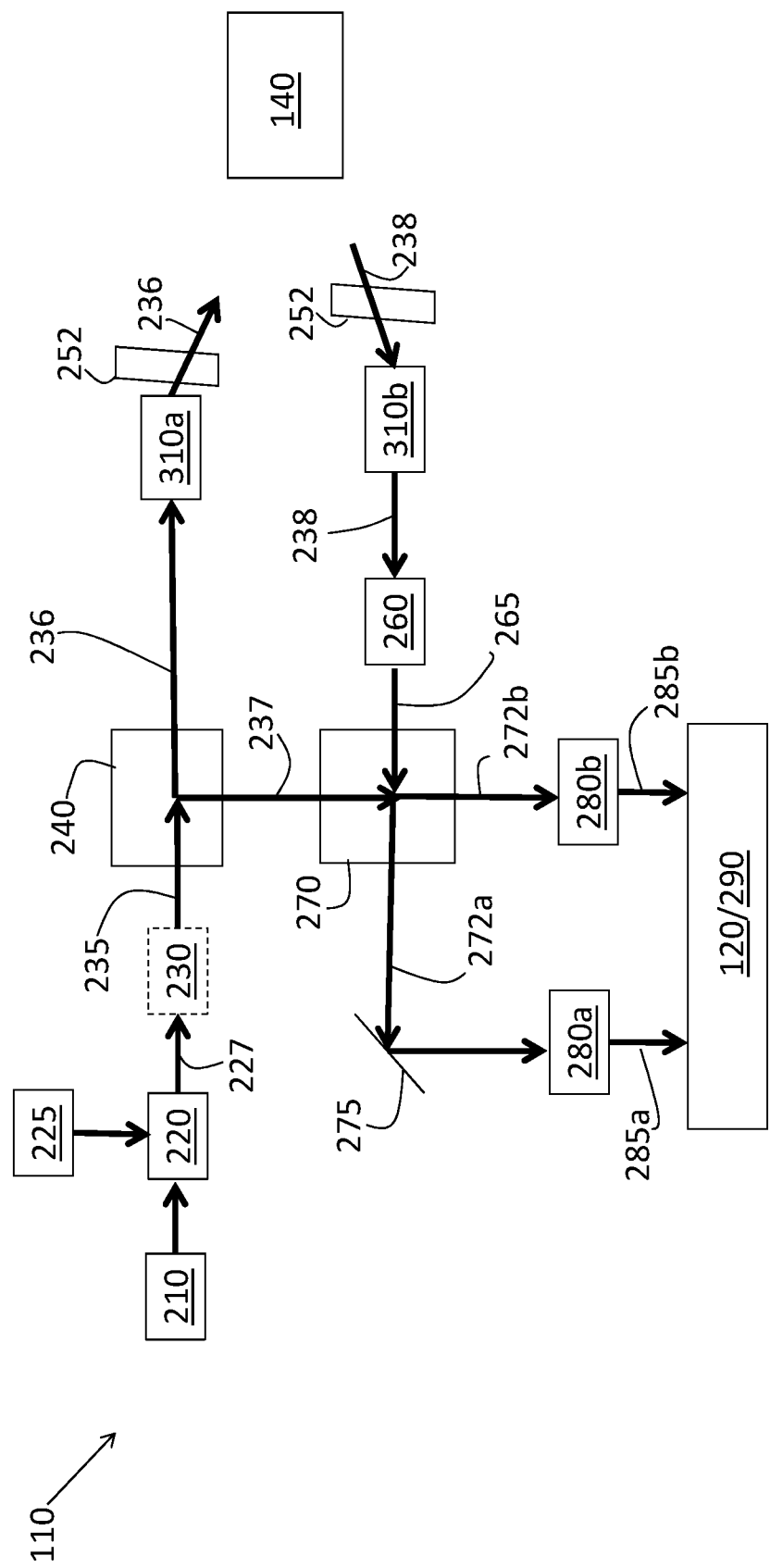
FIG. 3 is a block diagram detailing the lidar system with an optical amplifier in the return path of the lidar system according to alternate one or more embodiments.

FIG. 2 is a block diagram detailing the lidar system 110 with an optical amplifier 260 in the return path of the lidar system 110 according to one or more embodiments. A monostatic lidar system 110, in which transmit and receive paths share the same aperture lens 252 (e.g., monocentric lens), is shown. In alternate embodiments, the lidar system 110 may instead be bistatic and include a different aperture lens 252 for the transmission of light and the reception of resulting reflections, as shown in FIG. 3. The lidar system 110 includes a light source 210. The light source 210 may be a laser diode such as a distributed feedback (DFB) laser according to an exemplary embodiment. The light source 210 outputs a continuous wave of light, which exhibits a constant amplitude. The next stage in the light output system includes an optical resonator 220.

The resonator 220 is an external optical cavity, external to the light source 210, According to the exemplary embodiment shown in FIG. 2, a controlled voltage 225 from a voltage source is applied to the resonator 220 to perform electro-optical modulation and modulate the frequency of the continuous wave of light in the resonator 220 to produce FMCW light 227. According to the exemplary embodiment, the feedback of some light from the resonator 220 to the light source 210 means that the light generated within the light source 210 and the light output by the resonator 220 are modulated synchronously. The controlled voltage 225 may be increased or decreased linearly in order to produce light that exhibits linear frequency modulation (i.e., a linear FMCW signal). Alternately, the controlled voltage 225 may be varied non-linearly to produce light that exhibits non-linear frequency modulation.

According to alternate embodiments, the FMCW light 227 may be obtained by modulating the frequency at the light source 210 itself. In this case, the controlled voltage 225 applied to the resonator 220, as shown in FIG. 2, may be applied directly to block 210. For example, the bias current of the laser chip may be changed or a physical cavity or mirror of the light source 210 may be modulated. This modulation may be implemented by piezoelectric or micro-electromechanical systems (MEMS) actuation, for example. As FIG. 2 indicates, an optional optical amplifier 230 may be used to amplify the FMCW light 227 output by the resonator 220 to produce the FMCW signal 235.

A beam splitter 240 is used to split the FMCW signal 235 into an output signal 236 and a local oscillator (LO) signal 237. Both the output signal 236 and the LO signal 237 exhibit the frequency modulation imparted by the controlled voltage 225 or other modulator. The beam splitter 240 may be an on-chip waveguide splitter, for example. The output signal 236 is provided to a light circulating element, a circulator 250, which is necessary in the monostatic system shown in FIG. 2 to facilitate using the same aperture lens 252 for both the transmit and receive paths. The circulator 250 directs the output signal 236 out of the lidar system 110 through an aperture lens 252. As FIG. 3 indicates, in a bistatic system, the circulator 250 is not needed but a second aperture lens 252 is used such that the output signal 236 and receive beam 238 do not share the same aperture lens 252.

As FIG. 3 also indicates, a beam steering device 310 may be used between the circulator 250 and aperture lens 252 to steer the output signal 236 and scan over a given field of view, for example. The steering device 310 is further discussed with reference to FIG. 3 but may be used with a monostatic system, as well. If a target 140 is in the field of view of the lidar system 110, as in the example shown in FIG. 2, the output signal 236 output via the circulator 250 through the aperture lens 252 is scattered by the target 140. Some of that scattered light reenters the lidar system 110 as a receive beam 238. The receive beam 238 is directed by the circulator 250 to a reflector 255. The reflector 255 directs the receive beam 238 to optical amplifier 260 according to one or more embodiments.

While the optical amplifier 260 is shown between the reflector 255 and an alignment element 270 in FIG. 2, the optical amplifier may instead be located between the circulator 250 and the reflector 255, along the path indicated as A. According to exemplary embodiments, the optical amplifier 260 may include coupling lenses to direct the receive beam 238 into the optical amplifier 260 without loss. The optical amplifier 260 may also include shaping optics to ensure that the amplified receive beam 265 provided by the optical amplifier 260 has the correct profile. These optional additional elements are further discussed with reference to FIG. 4. As previously noted, in a time-of-flight lidar system, this optical amplifier 260 cannot be in the path of the receive beam 238, as shown in FIG. 2.

The amplified receive beam 265 is provided to the alignment element 270 in which with the amplified receive beam 265 is aligned with the LO signal 237. The alignment element 270 ensures that the amplified receive beam 265 and the LO signal 237 are co-linear and splits the output into two co-linear signals 272a, 272b (generally referred to as 272). The co-linear signals 272a, 272b are respectively directed to photodetectors 280a, 280b (generally referred to as 280). As FIG. 2 indicates, one of the co-linear signals 272a is reflected by a reflector 275 in order to be directed into the corresponding photodetector 280a. The amplified receive beam 265 and LO signal 237, which are aligned in the co-linear signals 272, interfere with each other in the photodetectors 280. The interference between the amplified receive beam 265 and the LO signal 237 results in a coherent combination of the two beams. Thus, the lidar system 110 is referred to as a coherent lidar system, unlike the time-of-flights systems. The interference in each photodetector 280 represents an autocorrelation function to identify an amplified receive beam 265 that resulted from the output signal 236. This prevents errant light from another light source outside the lidar system 110 that is within the field of view of the lidar system 110 from being mistaken for a receive beam 238 that is reflected by a target 140.

The photodetectors 280 are semiconductor devices that convert the result of the interference between the amplified receive beam 265 and the LO signal 237 in each co-linear signal 272 into electrical currents 285a, 285b (generally referred to as 285). Two photodetectors 280 are used in accordance with a known balanced detector technique to cancel noise that is common to both photodetectors 280. The electrical currents 285 from each of the photodetectors 280 are combined and processed to obtain information like range to the target 140, speed of the target 140, and other information according to known processing techniques. The processing may be performed within the lidar system 110 by a processor 290 or outside the lidar system 110 by the controller 120, for example. The processor 290 may include processing circuitry similar to that discussed for the controller 120.

FIG. 3 is a block diagram detailing the lidar system 110 with an optical amplifier 260 in the return path of the lidar system 110 according to alternate one or more embodiments. A bistatic lidar system 110, which includes separate transmit and receive aperture lenses 252, is shown. Most of the bistatic lidar system 110, shown in FIG. 3, is identical to the monostatic lidar system 110, shown in FIG. 2. Thus, the components detailed with reference to FIG. 2 are not discussed again. As previously noted, the primary difference between the monostatic and bistatic systems is in the inclusion, in the bistatic system, of separate aperture lenses 252a, 252b (generally referred to as 252) for the output signal 236 and receive beam 238. In FIG. 3, steering device 310a, 310b (generally referred to as 310) are shown. The steering device 310a is in the transmit path and the steering device 310b is in the receive path. As previously noted, one steering device 310 may be included between the circulator 250 and aperture lens 252 in the monostatic embodiment shown in FIG. 2, as well. The steering devices 310 may be reflectors (e.g., MEMS scanning mirrors).

Figure 4:
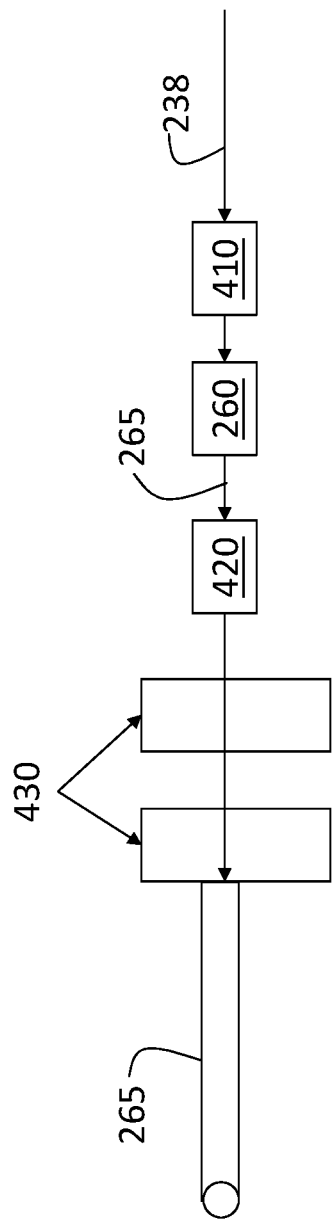
FIG. 4 depicts optional shaping optics that may be included with the optical amplifier according to one or more embodiments.

FIG. 4 depicts optional shaping optics that may be included with the optical amplifier 260 according to one or more embodiments. A coupling lens 410 would reduce the diameter of the incoming receive beam 238. For example, if the receive beam 238 had a diameter on the order of 1 millimeter (mm), the coupling lens 410 may reduce that to the order of microns in order to put the receive beam 238 through the optical amplifier 260. On the other side of the optical amplifier 260, a collimating lens 420 restores the diameter of the amplified receive beam 265. An anamorphic prism pair 430 ensures a desired shape for the cross-section of the amplified receive beam 265. For example, in the exemplary embodiment shown in FIG. 4, the amplified receive beam 265 has a circular cross-sectional shape.

Figure 5:
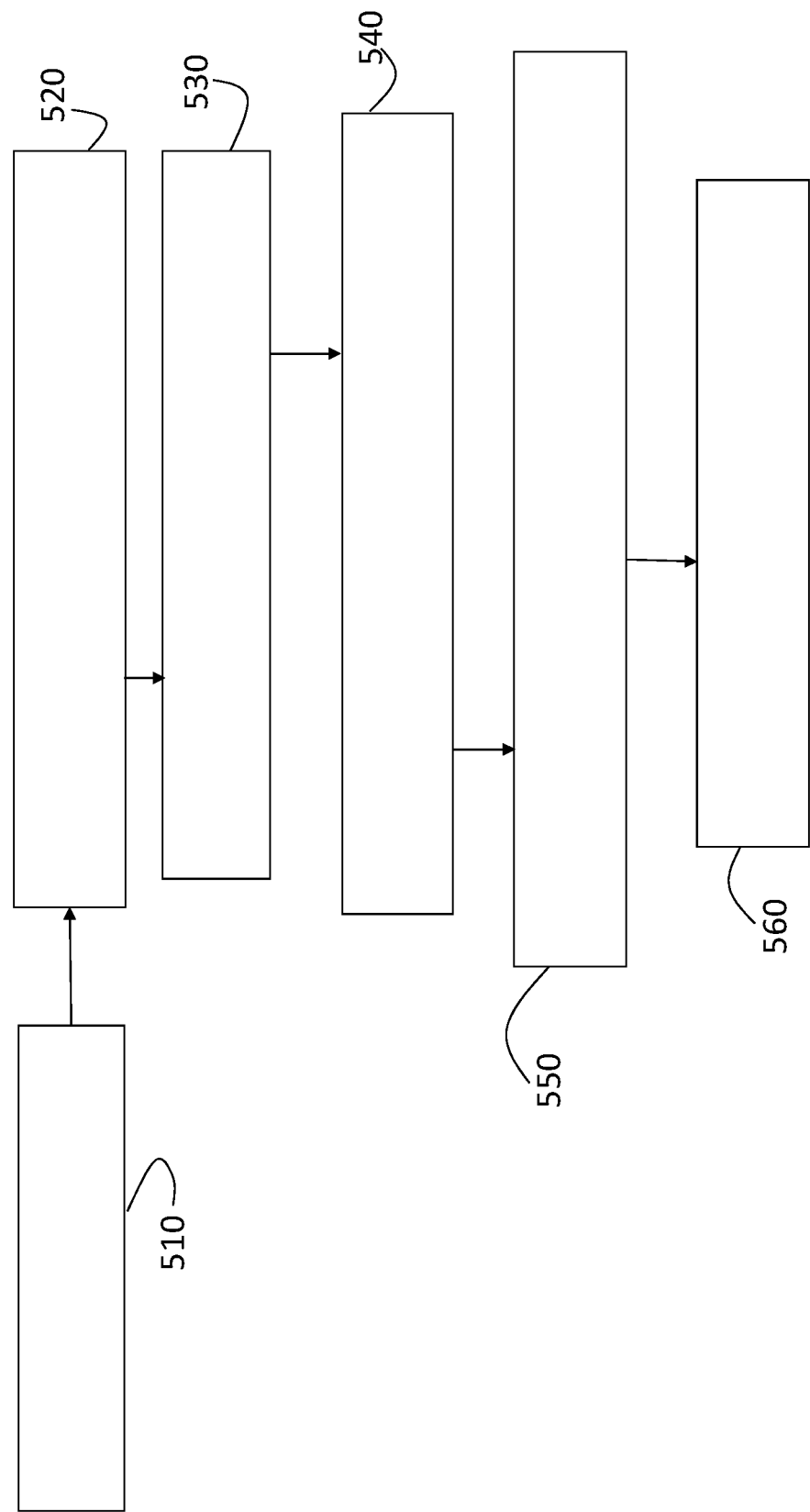
FIG. 5 is a process flow of a method of assembling a coherent lidar system with an optical amplifier in the return path according to one or more embodiments.

FIG. 5 is a process flow of a method of assembling a coherent lidar system 110 with an optical amplifier 260 in the return path according to one or more embodiments. At block 510, arranging a light source 210 to output a continuous wave includes arranging a laser such as a DFB laser according to an exemplary embodiment. At block 520, the process includes disposing elements at the output of the light source 210 to provide an FMCW signal 235 to a beam splitter 240. The elements may include the resonator 220 and the controlled voltage 225, according to an exemplary embodiment. Optionally, the elements may also include the optical amplifier 230. Arranging the beam splitter 240 to produce the output signal 236 and the LO signal 237, at block 530, includes the FMCW light 227 or, when the optical amplifier 230 is used, the FMCW signal 235 being input to the beam splitter 240.

At block 540, arranging one or more aperture lenses 252 to transmit the output signal 236 and obtain the receive beam 238 refers to the fact that one aperture lens 252 may be used in a monostatic system while a separate transmit and receive aperture lenses 252 may be used in a bistatic system. As such, in the exemplary case of a monostatic system, the process at block 540 includes arranging a circulator 250 to direct the output signal 236 out of the lidar system 110 and direct the receive beam 238 to the receive path of the lidar system 110. In addition, the process at block 540 may include arranging one or more steering devices 310 such that a beam steering device 310 is in the path of the output signal 236 and receive beam 238. Disposing an optical amplifier 260 between the aperture lens 252 and the alignment element 270 that is configured to output co-linear signals 272, at block 550, refers to disposing the optical amplifier 260 along the path indicated as A in FIG. 2 or between a reflector 255 and the alignment element 270, as shown in FIG. 2, for example. At block 560, the process includes disposing photodetectors 280 and a processor 120, 290 to detect and process the co-linear signals 272, as discussed with reference to FIG. 2.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A coherent lidar system, comprising:
a light source configured to output a continuous wave;
a modulator configured to modulate a frequency of the continuous wave and provide a frequency modulated continuous wave (FMCW) signal;
an aperture lens configured to obtain a receive beam resulting from a reflection of an output signal obtained from the FMCW signal;
an optical amplifier in a path of the receive beam configured to output an amplified receive beam;
a beam splitter configured to split the FMCW signal into the output signal and a local oscillator (LO) signal;
an alignment element configured to align the LO signal and the amplified receive beam and to split a result of aligning into two or more co-linear signals; and
two or more photodetectors corresponding with the two or more co-linear signals, each of the two or more photodetectors being configured to receive an interference result based on interference between the LO signal and the amplified receive beam in one of the two or more co-linear signals.

2. The system according to claim 1, further comprising a second optical amplifier configured to amplify the FMCW signal provided by the modulator.

3. The system according to claim 1, wherein the modulator includes a resonator.

4. The system according to claim 3, wherein the modulator is further configured to apply a controlled voltage to the resonator such that modulation of the controlled voltage results in modulation of the frequency of the continuous wave.

5. The system according to claim 1, wherein the lidar system is a monostatic system.

6. The system according to claim 5, further comprising a circulator configured to direct the output signal to the aperture lens and direct the receive beam to the optical amplifier.

7. The system according to claim 1, wherein the lidar system is within or on a vehicle and is configured to detect a location and speed of an object relative to the vehicle.

8. A method of assembling a coherent lidar system, the method comprising:
arranging a light source to output a continuous wave;
disposing elements to modulate the continuous wave and provide a frequency modulated continuous wave (FMCW) signal;
arranging an aperture lens to obtain a receive beam resulting from a reflection of an output signal obtained from the FMCW signal; and
disposing an optical amplifier in a path of the receive beam to output an amplified receive beam;
arranging a beam splitter to split the FMCW signal into the output signal and a local oscillator (LO) signal;
disposing an alignment element to facilitate alignment of the LO signal and the amplified receive beam and a split of a result into two or more co-linear signals; and
disposing two or more photodetectors corresponding with the two or more co-linear signals, each of the two or more photodetectors being configured to receive one of the two or more co-linear signals that indicates interference between the LO signal and the amplified receive beam.

9. The method according to claim 8, further comprising disposing a second optical amplifier to amplify the FMCW signal provided by the elements.

10. The method according to claim 8, wherein the disposing the elements to modulate the continuous wave includes disposing a resonator at an output of the light source.

11. The method according to claim 10, wherein the disposing the elements to modulate the continuous wave also includes applying a controlled voltage to the resonator such that modulation of the controlled voltage results in modulation of the frequency of the continuous wave.

12. A vehicle, comprising:
a coherent lidar system comprising:
    a light source configured to output a continuous wave;
    a modulator configured to modulate a frequency of the continuous wave and provide a frequency modulated continuous wave (FMCW) signal;
    an aperture lens configured to obtain a receive beam resulting from a reflection of an output signal obtained from the FMCW signal;
    an optical amplifier in a path of the receive beam configured to output an amplified receive beam;
    a beam splitter configured to split the FMCW signal into the output signal and a local oscillator (LO) signal;
    an alignment element configured to align the LO signal and the amplified receive beam and to split a result of aligning into two or more co-linear signals; and
    two or more photodetectors corresponding with the two or more co-linear signals, each of the two or more photodetectors being configured to receive an interference result based on interference between the LO signal and the amplified receive beam in one of the two or more co-linear signals; and
a controller configured to augment or automate operation of the vehicle based on information from the coherent lidar system.

13. The vehicle according to claim 12, wherein the coherent lidar system further comprises a second optical amplifier configured to amplify the FMCW signal provided by the modulator.

14. The vehicle according to claim 12, wherein the modulator includes a resonator.

15. The vehicle according to claim 14, wherein the modulator is further configured to apply a controlled voltage to the resonator such that modulation of the controlled voltage results in modulation of the frequency of the continuous wave.

* * * * *